United States Patent [19]

Dench

[11] Patent Number: 4,497,537

[45] Date of Patent: Feb. 5, 1985

[54] ELECTRIC AND/OR OPTICAL CABLE

[75] Inventor: Godfrey R. M. Dench, Orpington, England

[73] Assignee: BICC Public Limited Company, London, England

[21] Appl. No.: 502,809

[22] Filed: Jun. 9, 1983

[51] Int. Cl.³ ............................ G02B 5/16; H01B 7/14
[52] U.S. Cl. ................................ 350/96.23; 174/121 R
[58] Field of Search .................... 350/96.23; 174/70 R, 174/121 R, 121 AR, 121 SR

[56] References Cited

U.S. PATENT DOCUMENTS

| | | | |
|---|---|---|---|
| 2,225,298 | 12/1940 | Cook | 174/121 R |
| 4,227,770 | 10/1980 | Gunn | 350/96.23 |
| 4,375,313 | 3/1983 | Anderson et al. | 350/96.23 |

FOREIGN PATENT DOCUMENTS

| | | | |
|---|---|---|---|
| 54-36949 | 3/1979 | Japan | 350/96.23 |
| 56-132302 | 10/1981 | Japan | 350/96.23 |
| 968061 | 8/1963 | United Kingdom . | |
| 977038 | 12/1964 | United Kingdom . | |
| 1139961 | 1/1969 | United Kingdom . | |
| 1153129 | 5/1969 | United Kingdom . | |
| 1307796 | 2/1973 | United Kingdom . | |
| 1346120 | 2/1974 | United Kingdom . | |
| 1420792 | 1/1976 | United Kingdom . | |
| 1583353 | 1/1981 | United Kingdom . | |
| 1584248 | 2/1981 | United Kingdom | 350/96.23 |

*Primary Examiner*—John Lee
*Attorney, Agent, or Firm*—Buell, Ziesenheim Beck & Alstadt

[57] ABSTRACT

In an electric and/or optical cable for use suspended under water at depths of at least 1,000 m or for direct burial in the ground, each core is surrounded by a water-impermeable barrier comprising a cushioning layer of elastomeric material and, a longitudinally applied, transversely folded metal tape carrying on its outer surface a plastics coating and an outer plastics sheath is bonded to the plastics coating of the water-impermeable barrier. The metal tape has a helically extending corrugation formed by winding around the folded tape, prior to application of the plastics sheath, a plastics coated terylene filament which is applied under such a tension as to form the helical corrugation and to cause elastomeric material of the cushioning layer to fill the trough of the helical corrugation in the inner surface of the folded tape, the plastics coating on the terylene filament being bonded to the plastics sheath. Six cores are laid up around a central tensile member comprising a multiplicity of non-metallic filaments of high tensile strength so arranged that each filament lies substantially parallel to the axis of the cable, the assembly of cores being surrounded by a binding layer of helically wound tin-bronze tape and a serving layer of helically lapped polypropylene tape.

12 Claims, 1 Drawing Figure

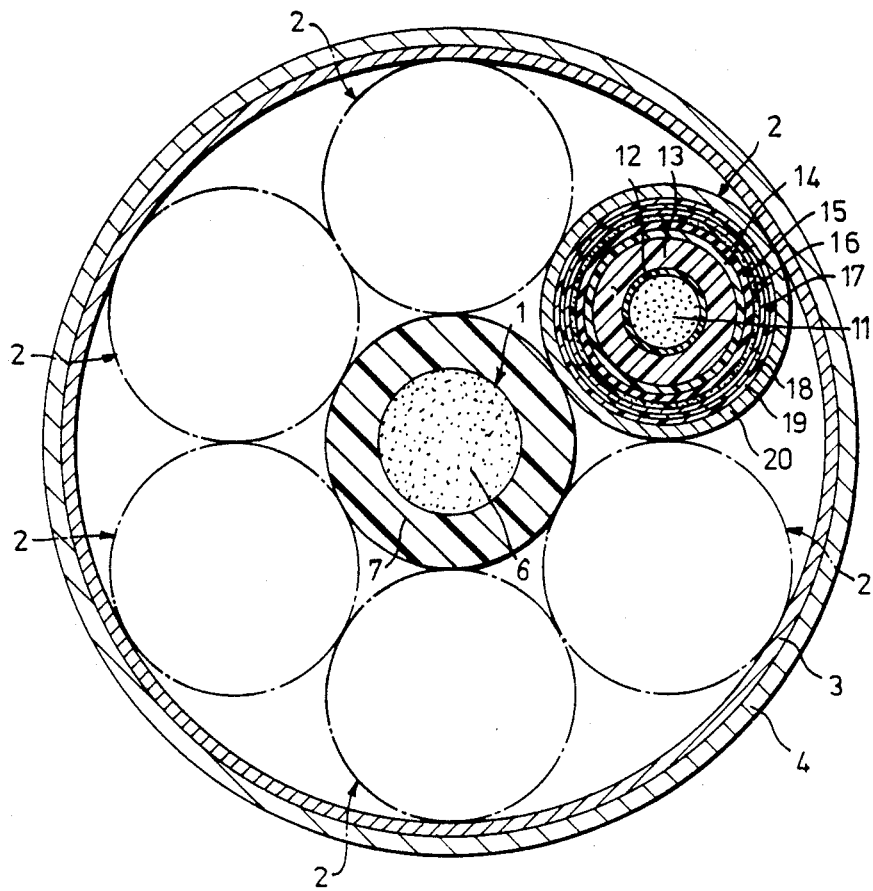

ELECTRIC AND/OR OPTICAL CABLE

This invention relates to electric and/or optical cables and more particularly to waterproof electric and/or optical cables for use under water, buried directly in the ground or in any other location in which entry of water or moisture into the interior of the cable might occur if the cable were not rendered waterproof.

It is common practice to render waterproof an electric cable that is to be installed under water by enclosing the cable within an extruded sheath of metal or metal alloy that is suitably protected against corrosion. However, where it is required to suspend an electric cable under water under its own weight substantially vertically or in a catenary curve, e.g. when feeding an oil or gas production facility on the seabed at a depth of several hundreds of meters, the cable must be of such a construction that, not only must it be able to withstand an external water pressure which might be in the region of one hundred bar, but, whilst in service, it must also be capable of withstanding many millions of flexing cycles caused by the heavy water currents to which the cable will be subjected when suspended at such water depths. Under such conditions an electric cable with an extruded metal sheath is unable to withstand the many millions of flexing cycles to which it will be subjected and, consequently, a metal sheathed electric cable is not suitable for feeding an oil or gas production facility located on the seabed at a depth of several hundreds of meters.

It is an object of the present invention to provide an improved electric and/or optical cable which is suitable for use when suspended under water at depths of at least 1000 meters and which, during its service life at such depths, is capable of withstanding at least several million flexing cycles, and which is suitable for direct burial in the ground.

According to the invention, the improved electric and/or optical cable comprises at least one electric and/or optical cable core, and, surrounding the core or assembly of cores, a water-impermeable barrier comprising a cushioning layer of elastomeric material; a substantially circumferentially continuous wall of metal or metal alloy constituted by at least one longitudinally applied, transversely folded metal tape which carries a coating of plastics material on its outwardly facing surface; at least one elongate flexible binder helically wound around the metal wall under such a tension that a helically extending corrugation or helically extending corrugations is or are formed in the metal wall throughout the length of the cable and that elastomeric material of the cushioning layer fills the trough of the or each helical corrugation in the inner surface of the metal wall; and, surrounding the metal wall, an extruded sheath of plastics material which is bonded to the plastics coating on the outer surface of the metal tape or tapes constituting the metal wall.

At least the outer surface of the or each flexible binder preferably is of plastics material and preferably, also, the plastics material of the overlying sheath bonds not only to the plastics coating on the outer surface of the or each metal tape but also to the plastics surface of the or each flexible binder. The or each flexible binder may be a plastics coated wire or strand, a bare wire or strand, or a plastics coated nonmetallic filament, e.g. a filament of terylene or an aromatic polyamide, such as that sold under the Trade Mark "Kevlar".

Preferably, the or each metal tape constituting the metal wall also carries a coating of plastics material on its inwardly facing surface and, preferably also, this plastics coating is bonded to the elastomeric material constituting the cushioning layer.

The or each metal tape forming the metal wall is preferably of copper or a copper-based alloy or of aluminium or an aluminium-based alloy.

Where the cable of the present invention is an electric cable, it may be an electric power cable and, in this case, the core may be a single stranded electric conductor. Alternatively, the cable may be a telecommunications cable and, in this case, the core may be a multiplicity of plastics insulated conductors. Where the cable of the present invention is an optical cable, the core may be an extruded elongate body of plastics material having a bore in which a separate optical fibre and/or an optical bundle is loosely housed or the core may be at least two plastics tubes assembled together, in at least one of which tubes at least one separate optical fibre and/or at least one optical bundle is loosely housed. The cable of the present invention may be a combination of any two or more of an electric power cable, a pilot or telecommunication cable and an optical cable.

A single core electric power cable in accordance with the present invention may also constitute one core of a multi-core electric power cable.

The water-impermeable barrier of the improved electric and/or optical cable of the present invention provides the important advantage that it will withstand heat and pressure cycling under service conditions more satisfactorily than other forms of water-impermeable barriers hitherto proposed and used and that, therefore, it has improved resistance against fatigue.

The invention will be further illustrated by a description, by way of example, of a preferred 11 KV multi-core electric power cable for suspension under water under its own weight in a catenary curve with reference to the accompanying diagrammatic drawing which shows a transverse cross-sectional view of the cable.

Referring to the drawing, the cable comprises a central flexible tensile member 1, six cores 2 laid helically around the central tensile member and, surrounding the cores, a binding layer 3 of helically wound tape of tin-bronze, the direction of lay of the tape being opposite to that of the helically laid cores, and a serving layer 4 of helically lapped tape of polypropylene, the direction of lay of the serving layer being opposite to that of the binding layer.

The central tensile member 1 comprises a multiplicity of filaments 6 of Kevlar, which filaments all lie substantially parallel to the axis of the cable and, surrounding the multiplicity of filaments, a sheath 7 of polyethylene.

The six cores 2 are arranged two cores per phase and each core comprises a flexible stranded conductor 11; a conductor screen 12 comprising a layer of semi-conducting tape and an extruded layer of semi-conducting cross-linked polyethylene; a dielectric wall 13 comprising an extruded layer of cross-linked polyethylene; a dielectric screen 14 comprising an extruded layer of semi-conducting cross-linked polyethylene; a water-impermeable barrier comprising a cushioning layer 15 of non-vulcanised butyl rubber, a circumferentially continuous copper wall constituted by a longitudinally applied transversely folded copper tape 17 having on its inner surface a coating 16 of polyester which is bonded to the cushioning layer 15 and having on its outer surface a coating 18 of polyethylene and a plastics coated terylene filament 19 helically wound around the transversely folded polythene-coated copper tape 17 under such tension as to form in the copper wall a helical corrugation, the helical trough on the inner surface of the transversely folded polythene-coated copper tape being filled with non-vulcanised butyl rubber; and, overlying and bonded to the polyethylene coating 18 and to the plastics coated terylene filament 19, an extruded overall sheath 20 of high density polyethylene.

The cable illustrated in the drawing, when suspended under water in a catenary curve to a depth of 1000 m, is capable of withstanding an external water pressure of 100 bar and at least several million flexing cycles. In addition, the central tensile member takes substantially all the tensile load to which the suspended cable will be subjected so that there is negligible risk that the suspended cable will twist or become tangled.

The cable illustrated in the drawing is also suitable for burial directly in the ground.

What I claim as my invention is:

1. A cable comprising at least one cable core, and, surrounding the core or assembly of cores, a water-impermeable barrier comprising a cushioning layer of elastomeric material; a substantially circumferentially continuous wall of metal or metal alloy constituted by at least one longitudinally applied, transversely folded metal tape which carries a coating of plastics material on its outwardly facing surface; at least one elongate flexible binder helically wound around the metal wall under such a tension that at least one helically extending corrugation is formed in the metal wall throughout the length of the cable and that elastomeric material of the cushioning layer fills the trough of the helical corrugation in the inner surface of the metal wall; and, surrounding the metal wall, an extruded sheath of plastics material which is bonded to the plastics coating on the outer surface of the metal tape or tapes constituting the metal wall.

2. A cable as claimed in claim 1, wherein at least the outer surface of the flexible binder is of plastics material and the plastics material of the overlying sheath is also bonded to the plastics surface of the flexible binder.

3. A cable as claimed in claim 1 or 2, wherein the flexible binder is at least one wire of metal or metal alloy having an outer coating of plastics material.

4. A cable as claimed in claim 1 or 2, wherein the flexible binder is a plastics coated non-metallic filament.

5. A cable as claimed in claim 1 or 2, wherein the or each metal tape forming the metal wall is of copper or a copper-based alloy.

6. An electric cable as claimed in claim 1 or 2, wherein the core is a single stranded electric conductor.

7. An electric cable as claimed in claim 1 or 2, wherein the core is a multiplicity of plastics insulated conductors.

8. An optical cable as claimed in claim 1 or 2, wherein the core is an extruded elongate body of plastics material having a bore in which at least one optical fibre is loosely housed.

9. An optical cable as claimed in claim 1 or 2, wherein the core is at least two plastics tubes assembled together, in at least one of which tubes at least one optical fibre is loosely housed.

10. A cable as claimed in claim 1, wherein the or each metal tape constituting the metal wall also carries a coating of plastics material on its inwardly facing surface.

11. A cable as claimed in claim 10, wherein the plastics coating on the inwardly facing surface of the or each metal tape is bonded to the elastomeric material constituting the cushioning layer.

12. A method of manufacturing a cable as claimed in claim 1, wherein the helically extending corrugation in the metal wall is formed after the or each metal tape has been longitudinally applied to and transversely folded around the cushioning layer by helically winding at least one elongate flexible binder around the metal wall under such a tension that a helically extending corrugation is formed in the metal wall throughout the length of the cable and that elastomeric material of the cushioning layer is caused to flow into and to fill the trough of the helical corrugation in the inner surface of the metal wall.

* * * * *